United States Patent [19]

Niederdellmann et al.

[11] Patent Number: 4,511,680
[45] Date of Patent: Apr. 16, 1985

[54] PROCESS FOR THE CONTINUOUS HIGH TEMPERATURE GLYCOLYTIC CLEAVAGE OF POLYURETHANE PLASTICS WASTE IN SCREW MACHINES

[75] Inventors: Georg Niederdellmann, Dormagen; Ernst Grigat, Leverkusen, both of Fed. Rep. of Germany

[73] Assignee: Bayer Aktiengesellschaft, Leverkusen, Fed. Rep. of Germany

[21] Appl. No.: 525,846

[22] Filed: Aug. 24, 1983

[30] Foreign Application Priority Data

Sep. 1, 1982 [DE] Fed. Rep. of Germany ....... 3232461

[51] Int. Cl.³ .................... B29C 29/00; C08J 11/00; C08L 75/00; B09B 3/00
[52] U.S. Cl. .................................. 521/49.5; 521/49; 528/495; 528/496; 366/82
[58] Field of Search .................. 521/49.5, 49

[56] References Cited

U.S. PATENT DOCUMENTS

| | | | |
|---|---|---|---|
| 3,632,530 | 1/1972 | Kinoshita | 564/393 |
| 3,708,440 | 1/1973 | Frulla et al. | 521/49.5 |
| 3,738,946 | 6/1973 | Frulla et al. | 521/49.5 |
| 3,983,087 | 9/1976 | Tucker et al. | 521/49.5 |
| 4,014,809 | 3/1977 | Kondo et al. | 252/182 |
| 4,051,212 | 9/1977 | Grigat et al. | 264/102 |
| 4,110,266 | 8/1978 | Sheratte | 521/49 |
| 4,136,967 | 1/1979 | Grigat et al. | 366/82 |
| 4,159,972 | 7/1979 | Braslaw et al. | 521/164 |
| 4,162,995 | 7/1979 | Sheratte | 521/49 |
| 4,267,078 | 5/1981 | Lidy et al. | 521/49 |
| 4,336,406 | 6/1982 | Gerlock et al. | 568/613 |
| 4,339,358 | 7/1982 | Schutz | 521/49.5 |

FOREIGN PATENT DOCUMENTS

| | | |
|---|---|---|
| 1144569 | 4/1983 | Canada . |
| 2738572 | 3/1979 | Fed. Rep. of Germany . |
| 52-92887 | 8/1977 | Japan . |
| 1492838 | 11/1977 | United Kingdom . |

OTHER PUBLICATIONS

Robert J. Sallom and C. C. Duff, *Polym.-Plast. Technol. Eng.*, 1982. 19, (1), pp. 1–20.
Polymer Eng. Sci. 18 (1978), No. 11, p. 846.
SYSpur Rep., 1977, Part 12, pp. 56–65.

*Primary Examiner*—A. Lionel Clingman
*Attorney, Agent, or Firm*—Gene Harsh; Joseph C. Gil

[57] ABSTRACT

A process for the continuous glycolytic cleavage of polyurethane plastics waste in multi-shaft screw machines by the addition of optionally preheated diols, at a degradation temperature of 250° C., while maintaining a pressure at least such that the polyurethane-diol mixture is in the liquid phase, by the discharge of the glycolysate mixture after short residence times of from 2 to 30 minutes in the reaction screw, and by rapid cooling of the glycolysate mixture.

7 Claims, 1 Drawing Figure

PROCESS FOR THE CONTINUOUS HIGH TEMPERATURE GLYCOLYTIC CLEAVAGE OF POLYURETHANE PLASTICS WASTE IN SCREW MACHINES

This invention relates to a process for the continuous glycolytic cleavage of polyurethane plastics waste in multi-shaft screw machines by the addition of optionally pre-heated diols, at a degradation temperature of 250° C., while maintaining a pressure at least such that the polyurethane-diol mixture is in the liquid phase, by the discharge of the glycolysate mixture after short residence times of from 2 to 30 minutes in the reaction screw, and by rapid cooling of the glycolysate mixture.

BACKGROUND OF THE INVENTION

The considerable growth of the polyurethane-producing industry has been accompanied by the problem of removing and re-using polyurethane waste or damaged products. A market has been found for polyurethane flexible foam scrap material by bonding this material to form composite bodies, but only a limited amount of waste flexible foam materials may be used in this manner. No similar application exists for semi-rigid and rigid polyurethane foam waste or for elastomer granulates. Therefore, large quantities of rejected and damaged polyurethane products resulting from the production of rigid and flexible foams and of elastomers have to be deposited on dumps or destroyed in a refuse incinerator. These methods involve serious ecological, technical and economic problems due to the low specific weight and to the associated large volume of the rejected or damaged goods.

Therefore, for ecological and economic reasons, there is a considerable interest in economically recycling the constantly-increasing quantities of polyurethane waste. Several processes are known for the working-up and/or for the degradation of polyurethane plastics waste by glycolytic cleavage, in some cases with the addition of amino alcohols and/or catalysts. Such processes are known, for example, from German Auslegeschriften or Offenlegungsschriften Nos. 1,110,405; 2,238,109; 2,304,444; 2,414,091; 2,516,863; 2,557,172; 2,738,572; 2,759,054 and 2,902,509; from U.S. Pat. Nos. 3,632,530; 4,014,809; 4,110,266; 4,159,972 and 4,162,995; and from Japanese Patent Nos. 51 006-909; 52 004-596; 53 022-595 and 56 099-244.

Many of these publications clearly indicate that none of these known processes provides a satisfactory solution to the problem. The commercial scope of application and the economy of the described processes are actually severely restricted by a number of disadvantages:

(1) The dissolution and reaction times, which are generally several hours, result in unsatisfactory volume-time yields, which cause economic problems.

(2) The quantities of diol required for the dissolution and degradation of the polyurethane waste are within the range of equal weight quantities, but are often higher, so that the resulting reclaimed polyols quantitatively amount to several times the amount of original waste and, additionally, in many cases, more reactive and more expensive amino alcohols are used simultaneously with the diols in order to affect the degradation of the wastes.

(3) For the long reaction times which have been described (for example, from 2 to 12 hours), the degradation temperatures of up to 250° C. result in undesirable secondary reactions and in a thermal impairment to the recovered polyols, limiting the amount of these reclaimed polyols which may be blended with a pure polyol. With respect to the quantities of regenerated polyol which clearly exceed the quantities of original waste, this limitation results in very great difficulties when returning these recovered polyols into the production process.

(4) A limited curtailment of the reaction time and/or a reduction in the degradation temperature may be achieved by shifting the pH, by adding certain catalysts and/or by the simultaneous use of codegraders, for example ammonia, amines or alkanolamines, but the properties of the recovered polyols which are changed by the catalysts or codegraders have a disadvantageous effect on the re-use of these polyols.

(5) Polyurethane plastics are characterized by the extraordinarily-varied chemical structure thereof. Depending on the desired properties in each case, in addition to urethane bonds, they may also contain urea, biuret, allophanate, isocyanurate, carbodiimide and/or ester groups. This requires an optimization of the degradation conditions which is related to the formulation in each case, and a specific selection of suitable degradation diols or diol-co-degrader mixtures. The claims of the above-mentioned patents which are very specific in some respects are also to be understood within this sense. Thus, for example, German Offenlegungsschrift No. 2,304,444 specifically claims the degradation of polyisocyanurate waste, while Offenlegungsschrift No. 2,414,091 provides the degradation of polyurethanes containing carbodiimide groups. Therefore, polyurethane waste mixtures of varying compositions and a waste of an unknown formulation cannot be worked-up in a commercially-satisfactory manner by any single known process.

(6) The number of materials which are flame-retarded by the addition of chloroalkyl phosphates is increasing in the field of flexible and rigid polyurethane foams. In the glycolytic cleavage of foam waste, phosphate esters of this type produce recovered polyols which have high acid numbers, which do not allow a direct use, and which necessitate an after-treatment with propylene oxide (Kunststoff-Journal No. 5 (1975), pp. 24; Polymer Eng. Sci. 18 (1978), No. 11, pp. 846; SYSpur Rep. 1977, Part 12, pp. 56–65). However, working with propylene oxide requires a considerable expense in apparatus and with regard to safety.

Surprisingly, it has now been found that polyurethanes of the most varied compositions may be degraded into reusable polyols in an economic, controllable and continuous manner. This process may be completed in a short time and at an elevated temperature, with a relatively low requirement of degradation glycol, without substantially impairing the recovered polyols, and without the above-mentioned disadvantages, in a widely-applicable method using a specifically equipped screw machine. Hitherto, the use of screw machines has only been described for the irreversible, continuous hydrolysis of polyurethane waste, as in German Offenlegungsschrift No. 2,442,387. It came as a complete surprise that machines of this type may also be used in an economic manner for continuously carrying out reversible transurethanization reactions, because glycolysis is essentially an equilibrium of transurethenization, while hydrolysis is an irreversible reaction with the release of $CO_2$.

DESCRIPTION OF THE INVENTION

Figure 1:
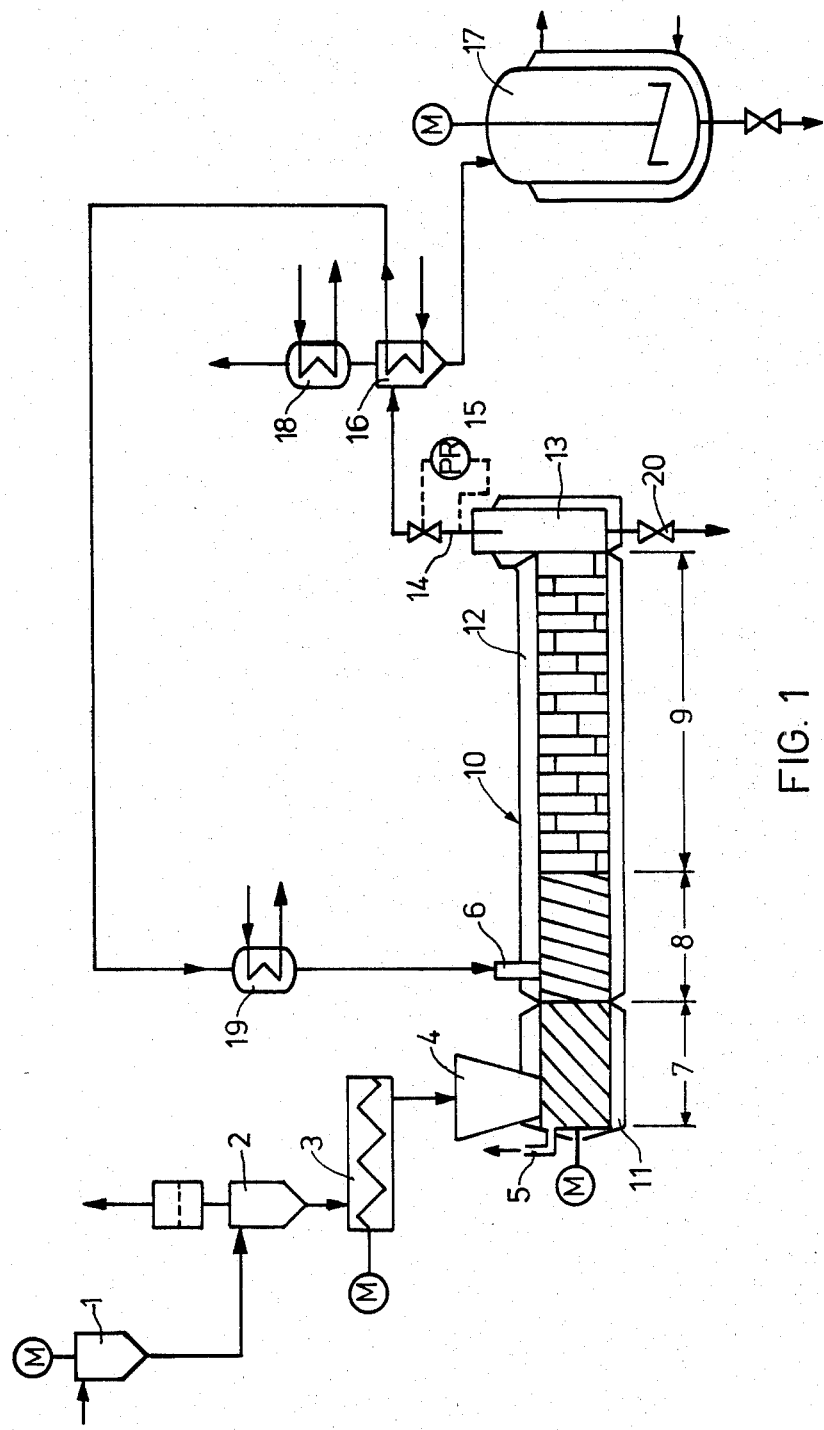
FIG. 1 Schematic of an apparatus for transurethanization of polyurethane plastics waste materials.

The present invention provides a process for the continuous glycolytic cleavage of polyurethane plastics waste by the addition of diols which may be pre-heated, optionally in the presence of alkali metal alcoholate catalysts, the process being carried out at an elevated temperature and under elevated pressure. The process is characterized in that the plastics waste is introduced into a multi-shaft screw machine together with diols in a weight ratio of from 10:1 to 1:1, preferably of from 5:1 to 2:1, optionally with the addition of alkali metal glycolates. The mixture of plastics waste and diols, and optionally alkali metal glycolates, is maintained in the screw machine in a reaction zone with intensive material and heat exchange for from 2 to 30 minutes, preferably for from 5 to 15 minutes, at a temperature of from about 250° to 350° C., preferably of from 260° to 330° C., more preferably of from 260° to 300° C., while maintaining a liquid diol phase in the degradation mixture by a pressure of up to 100 bars, preferably of up to 80 bars, more preferably of from 5 to 30 bars. The polyol-containing degradation mixture resulting from the glycolytic degradation issues into a cooled pressure-relieving vessel, then into a cooled receiver via a discharge outlet connected to the screw machine, while maintaining the liquefying pressure and a constant liquid level, with the temperature of the resulting degradation polyol mixture being reduced to below 200° C., preferably to below 150° C., more preferably to from 80° to 100° C., in less than 30 minutes, preferably over a period of from 5 to 15 minutes.

The process is preferably carried out in a screw machine comprising a housing, the temperature of which may be controlled, a feed funnel, a discharge outlet and multi-shaft screws rotating in the same direction, wherein the screw shafts have a drawn-in section with threads of high pitch (more than 90 mm, preferably more than 100 mm) extending beyond the region of the feed funnel, which section is joined by a compression section with threads of low pitch (less than 70 mm, preferably less than 60 mm), while the remaining reaction zone section of the screw shaft is composed of kneading discs. It is a further characteristic of the screw machine that, seen in the conveying direction, an air exhaust is provided upstream of the feed funnel, that a glycol introduction discharges downstream of the feed funnel in the region of the threaded section of low pitch and that the discharge outlet is provided with pressure and level regulation. The polyol-containing degradation mixture resulting from the glycolytic cleavage is conveyed out of the screw machine into the discharge outlet connected thereto, and from there it passes, via a plunge pipe which maintains a constant liquid level inside the discharge outlet, and then via a control valve which maintains a constant screw machine pressure in the discharge outlet, initially to arrive in a cooled, pressure-relieving vessel and then into a cooled receiver. The diol used for degradation is preferably pre-heated by heat exchangers at the discharge part of the machine for the introduction into the multi-shaft screw, and it is preferably heated to a temperature of from 150° to 250° C.

A suitable screw machine comprising a discharge outlet is known from German Offenlegungsschrift No. 2,442,387, in which a hydrolysis of polyurethane waste is carried out by adding water.

In the process according to the present invention, the following individual steps have to be carried out successively or simultaneously:

(1) continuous transport and degassing of the polyurethane waste;

(2) continuous introduction of the diol which is preferably pre-heated to from 150° to 250° C.;

(3) build-up of the temperature in the polyurethane/diol mixture to from about 250° to 350° C.;

(4) build-up of pressure in the polyurethane/diol mixture to at least a pressure under which the diol-glycolysate mixture remains liquid at the elevated temperature, i.e., pressures of up to 100 bars;

(5) intensive material exchange within the reaction zone in which the glycolytic cleavage takes place, for from about 2 to 30 minutes, preferably for from 5 to 15 minutes;

(6) venting of the glycolysate to normal pressure;

(7) cooling of the glycolysate to a temperature of below 200° C., preferably below 150° C., more preferably from 80° to 100° C., over a period of less than 30 minutes, preferably from 5 to 15 minutes;

(8) continuous discharge of the glycolysate.

An apparatus which is particularly suitable for carrying out these procedural steps is a screw machine which is equipped as schematically illustrated in FIG. 1.

The polyurethane waste which is crushed in a plastics mill (1) is fed into a hopper (2) and then, by a continuous metering device (3) and a funnel (4), into a screw machine. An outlet (5) is provided in the housing upstream of the feed funnel in the direction of flow of the waste material in the screw machine for the release of entrained air, with provision for a slight vacuum to be advantageously applied to this outlet. The glycol which is required for the degradation is metered, preferably by means of a nozzle, into the screw machine through a housing inlet (6), just downstream of the waste feed funnel.

The screw spindle of the screw machine is divided into several zones. In the first draw-in part, up to just downstream of the feed funnel (4) and before inlet (6), a thread is used which has a high pitch (absorption thread (7), from about 10 to 18%, preferably from 11 to 15%, of the total length of the screw). Thereafter, a compression zone with a thread having a low pitch (pressure build-up thread (8), from about 10 to 17%, preferably from about 12 to 15%, of the screw length) is used to compress the plastics. Kneading discs (9) are applied to the remaining reaction zone length of the screw spindle downstream of the pressure build-up thread.

The complete screw housing (10) is provided with a temperature control device (cooling jacket (11) or heating jacket (12)). A specific discharge outlet (13) is flange-mounted to the end of the screw housing, from which the screw spindle slightly projects. the glycolysate flows out of this discharge outlet (13) through a plunge pipe (14) which ensures a constant filling level in the discharge outlet, and via a valve which is provided with pressure regulation (15) which maintains a constant working pressure in the discharge outlet. The pressure of the issuing glycolysate is reduced with cooling in a heat exchanger (16), which is provided with a condenser (18), and the glycolysate may be removed continuously or in discrete batches from a receiving tank (17) which has also been cooled.

The preferred pre-heating (preferably to from 150° to 250° C.) of the diol used for degradation is carried out by means of a heat transfer from the hot glycolysate in the heat exchanger (16) and, if necessary, via a second heat exchanger (19). Draining of the screw and discharge outlet may be accomplished via a discharge valve (20).

In order to achieve a large throughput with the necessary residence time and with as narrow a residence time spectrum as possible, it is advisable to use deep-cut (large volume) double screws which rotate in the same direction.

Of course, the glycolytic cleavage which is carried out in the described screw machine may also be carried out in the presence of catalysts and/or with the simultaneous use of co-degraders, for example, amines, alkanolamines or lactams. However, these additives are preferably not used, for while they allow lower degradation temperatures, they produce inferior recovered polyols due to the altered reactivities.

Characterizing features of the glycolytic degradation according to the present invention include:

(1) an optimum material and energy exchange caused by the kneading elements of the screw, is realized, even when only small quantities of degradation diol are added;

(2) extremely high degradation temperatures which push the degradation equilibrium in the required direction and result in economically short reaction times, are possible, even when there is only a low concentration of degradation glycol;

(3) short reaction times, which, in spite of the high degradation temperatures, surprisingly produce a virtually thermally-undamaged glycolysate which is superior, in this respect, to glycolysates of conventional discontinuous processes employing lower degradation temperatures, are used;

(4) a pressure, which is at least high enough for the diol/glycolysate mixture to remain liquid, may be maintained; and (5) rapid cooling, once degradation is complete, is possible to avoid subsequent thermal stresses and possible recondensations.

While other catalysts and co-degraders are not recommended, the simultaneous use of alkali metal glycolates is recommended during degradation in the case of polyurethanes which are difficult to degrade. This is particularly helpful in the case of polyisocyanurates and elastomers rich in rigid segments, especially for binding acid degradation products in the case of flame-resistant polyurethanes containing phosphate esters. Excess alkali metal may be bound as salt after degradation by neutralization, for example, with phosphoric acid, and then filtered off. A procedural step of this type is a conventional element of large-scale polyether production.

In contrast to specific transurethanization catalysts or co-degraders, alkali metal glycolates do not have a disadvantageous influence on the properties of the glycolysate in this way. Because of this lack of disadvantageous effects, the addition of alkali metal glycolates is recommended within the wide applicability of the present process, even for the degradation of unknown wastes or waste mixtures.

Diols which are suitable for the glycolytic degradation include all aliphatic diols having from 2 to about 20 carbon atoms. Such diols include ethylene glycol, diethylene glycol, triethylene glycol, tetraethylene glycol, propylene glycol, dipropylene glycol, tripropylene glycol, oligopropylene glycol, butane diols, dibutylene glycols, pentane diols, 3-methyl-pentane diol-1,5, neopentyl glycol, hexane diols, heptane diols or octane diols. The dimethylolpropane-rich distillation first-runnings of the commercial trimethylolpropane production and tri- and tetra-hydric alcohols, for example, glycerine, trimethylolpropane, hexane triols and pentaerythritol may also be used in the degradation reaction. However, tri- and tetra-hydric alcohols are preferably not used on their own, but in admixture with diols.

The alkali metal glycolysates which are optionally to be simultaneously used are obtained by the addition of from 5 to 20%, by weight, of alkali metal hydroxide, for example, potassium or sodium hydroxide, to the corresponding degradation diols, and by subsequent azeotropic dehydration, corresponding to the method which is generally known for the production of alkaline starting materials in the large-scale production of polyethers.

The following examples illustrate the present process.

The double shaft screw machine (of the ZDS-KG 90 type, manufactured by Werner & Pfleiderer) used in these examples contains two screws rotating in the same direction having a variable speed of from 0 to 300 r.p.m., a shaft diameter of 90 mm, a length of 2200 mm and a volume of 8.2 liters. The volume of the discharge outlet was about 0.5 liter. The pitch of the screw thread in the 330 mm long draw-in zone (introduction zone for the polyurethane waste) was 120 mm (double thread), and was reduced in the adjoining 260 mm long compression zone in stages from 60 mm to 30 mm (double-thread in each case). The 1610 mm long reaction zone joining thereto was initially equipped with a left-hand kneading block (30 mm) displaced by 30° to support the build-up of pressure, and then with right-hand kneading blocks displaced by 30°. In the case of throughputs of from 40 to 60 kg/h, the average residence times amounted to from about 8 to 13 minutes.

EXAMPLE 1

Crushed waste of a polyurethane flexible foam based on polyester (slightly branched polyester of adipic acid, diethylene glycol and trimethylolpropane having an OH number of from 57 to 63) and toluylene diisocyanate were delivered to the feed funnel of the screw machine in a constant rate of 42 kg/hour. Propylene glycol which had been pre-heated to 180° C. was simultaneously introduced into the screw machine, also in a constant quantity of 11.7 kg/hour, by a piston metering pump. The draw-in zone of the screw machine remains unheated, while the compression and reaction zones were heated to 290° C. The screw shaft speed was 200 revolutions/min. and the working pressure was 10 bars. The glycolysate issuing from the screw end after an average residence time of about 10 minutes, with a temperature of 280° C., was cooled to about 90° C. over a period of about 10 minutes in a heat exchanger. A light-brown polyol (glycolysate) was obtained which had:

Hydroxyl number: 436.4
Acid Number: 1.5
Viscosity (25° C.): 4180 mPa.s

The recovered polyol which was obtained could be converted into a usable polyurethane foam when blended with a polyether started on saccharose (addition product of propylene oxide to a mixture of saccharose, 1,2-propylene glycol and water; OH-number 320). (Baytherm 4030-M, Bayer AG, D-5090 Leverkusen)

50.0 parts, by weight, of recovered polyol,
50.0 parts, by weight, of saccharose polyether,
1.2 parts, by weight, of dimethyl benzylamine,
1.0 parts, by weight, of 50% aqueous solution of sulphonated castor oil,
0.5 parts, by weight, of silicone stabilizer "OS 710", produced by Bayer AG, Leverkusen, West Germany,
25.0 parts, by weight, of monofluorotrichloromethane, and
159.0 parts, by weight, of diphenylmethane diisocyanate (containing 26% NCO).

The reaction components, which were intensively mixed by a high-speed stirrer, produced, with a starting time of 15 seconds and a rise time of 6.5 minutes, a stable, rigid foam having a uniform, closed-cell pore structure and a bulk density of 50.2 kg/m$^3$.

EXAMPLE 2

40 kg/hour of the polyester polyurethane flexible foam waste of Example 1 were reacted with 15 kg/hour of diethylene glycol under the conditions described in Example 1. A recovered polyol was obtained having the following analytical data:

OH Number: 434.7
Acid Number: 2.7
Viscosity (25° C.): 1830 mPa.s

This recovered polyol could be converted into a usable polyurethane rigid foam on its own (Formulation a), and when blended with a polyether (Formulation b).

Formulation a 100.0 parts, by weight, of recovered polyol,
1.2 parts, by weight, of dimethyl benzylamine,
1.0 parts, by weight, of sulphonated castor oil (50% aqueous solution),
0.5 parts, by weight, of silicone stabilizer OS-710
25.0 parts, by weight, of monofluorotrichloromethane, and
188.0 parts, by weight, of diphenylmethane diisocyanate (26% of NCO) (Desmodur 44-P16-Bayer AG, D-5090 Leverkusen)

Starting time: 8 seconds
Rise time: 3.5 minutes

A stable, closed-cell rigid foam was obtained having a fairly uniform pore structure and a bulk density of 70.3 kg/m$^3$.

Formulation b 50.0 parts, by weight, of recovered polyol,
50.0 parts, by weight, of saccharose polyether of Example 1,
1.2 parts, by weight, of dimethyl benzylamine,
1.0 parts, by weight, of sulphonated castor oil (50% aqueous solution),
0.5 parts, by weight, of silicone stabilizer OS-710,
25.0 parts, by weight, of monofluorotrichloromethane, and
159.0 parts, by weight, of diphenylmethane diisocyanate (26% of NCO) (see example 2 a)

Starting time: 10 seconds
Rise time: 6 minutes.

A stable, closed-cell rigid foam was formed having a very uniform pore structure and a bulk density of 48.6 kg/m$^3$.

EXAMPLE 3

36.3 kg/hour of the polyester polyurethane flexible foam waste of Example 1 was reacted with 19 kg/hour of dipropylene glycol under the operational conditions of Example 1. The recovered polyol which was obtained had the following analytical data:

OH Number: 325.0
Acid Number: 2.1
Viscosity (25° C.): 5700 mPa.s

The recovered polyol could be foamed in a rigid foam formulation of:

100.0 parts, by weight, of recovered polyol,
1.2 parts, by weight, of dimethyl benzylamine,
1.0 parts, by weight, of sulphonated castor oil (50% aqueous solution),
0.5 parts, by weight, of silicone stabilizer OS-710,
25.0 parts, by weight, of monofluorotrichloromethane, and
140.0 parts, by weight, of diphenylmethane diisocyanate (26% of NCO) (see example 2 a).

A stable, closed-cell, rigid foam was obtained having a uniform pore structure and a bulk density of 57.8 kg/m$^3$.

EXAMPLE 4

52.4 kg/hour of crushed waste of a polyurethane flexible foam based on polyether (80% of a trifunctional copolyether started on trimethylolpropane with propylene oxide (about 85%, by weight) and ethylene oxide (about 15%, by weight), having an OH number of from 33 to 37 and 20% of a copolyether obtained by adding ethylene oxide/propylene oxide (10:90) to a mixture of trimethylpropane and propylene glycol (85:15), having an OH number of from 46 to 52) and toluylene diisocyanate, and 14 kg/hour of diethylene glycol were reacted under the operational conditions described in Example 1. A recovered polyol was obtained having the following analytical data:

OH Number: 198.3
Acid Number: 1.1
Viscosity (25° C.): 1920 mPa.s

The regenerated polyol could be converted into a rigid foam in admixture with the saccharose polyether described in Example 1 in the formulation:

50.0 parts, by weight, of recovered polyol,
50.0 parts, by weight, of saccharose polyether,
1.2 parts, by weight, of dimethyl benzylamine,
1.0 parts, by weight, of sulphonated castor oil (50% aqueous solution),
0.5 parts, by weight, of silicone stabilizer OS-710,
25.0 parts, by weight, of monofluorotrichloromethane and
108.0 parts, by weight, of diphenylmethane diisocyanate (26% of NCO) (see example 2 a).

Starting time: 10 seconds,
Rise time: 2.5 minutes.

The rigid foam thus obtained had a bulk density of 54.4 kg/m$^3$.

EXAMPLE 5

41.2 kg/hour of the polyether polyurethane flexible foam waste of Example 4 and 10 g/hour of the distillation first-runnings, rich in dimethylolpropane, from the commercial production of trimethylolpropane, having a hydroxyl number of 796, were reacted together under the operational conditions of Example 1. A reddishbrown recovered polyol was obtained with the following analytical values:
OH Number: 235.9
Acid Number: 1.0
Viscosity (25° C.): 4640 mPa.s The regenerated polyol could easily be converted into a rigid foam when blended with the saccharose polyether mentioned in Example 1 in the formulation:
66.7 parts, by weight, of recovered polyol,
33.3 parts, by weight, of saccharose polyether,
1.2 parts, by weight, of dimethyl benzylamine,
1.0 parts, by weight, of sulphonated castor oil (50% aqueous solution),
0.5 parts, by weight, of silicone stabilizer OS-710,
25.0 parts, by weight, of monofluorotrichloromethane, and
114.0 parts, by weight, of diphenylmethane diisocyanate (26% NCO) (see example 2 a).
Starting time: 10 seconds
Rise time: 4.5 minutes.
Bulk density of the rigid foam: 51.0 kg/m³.

EXAMPLE 6

(a) Production of propylene glycol alcoholate
6750 parts, by weight, of propylene glycol were mixed with 750 parts, by weight, of 50% aqueous potassium hydroxide and, after the addition of about 500 parts, by weight, of toluene, the mixture was dehydrated azeotropically at a sump temperature of about 120° C. After the release of water and stripping of the toluene, 7,000 parts, by weight, of propylene glycol alcoholate were obtained.

(b) Glycolysis of commercial polyurethane rigid foam waste of an unknown composition
40 kg/hour of a rigid polyurethane foam waste mixture of an unknown composition resulting from the production of insulating boards, and having varying flame protection and isocyanurate group content, and 20 kg/h of the propylene glycol alcoholate of (a) were reacted together under the operational conditions of Example 1. A brown, homogeneous recovered polyol having the following analytical data was produced:
OH Number: 609.1
Acid Number: 3.9
Viscosity (50° C.): 5054 mPa.s The recovered polyol could be converted into a usable rigid foam without a further after-treatment when blended with the saccharose polyether described in Example 1 in the formulation:
50.0 parts, by weight, of recovered polyol,
50.0 parts, by weight, of saccharose polyether,
1.2 parts, by weight, of dimethyl benzylamine,
1.0 parts, by weight, of sulphonated castor oil (50% aqueous solution),
0.5 parts, by weight, of silicone stabilizer OS-710,
25.0 parts, by weight, of monofluorotrichloromethane, and
197.0 parts, by weight, of diphenylmethane diisocyanate (26% of NCO) (see example 2 a).
Starting time: 10 seconds
Rise time: 2.5 minutes
Bulk density of the rigid foam: 40.1 kg/m³.

EXAMPLE 7

41 kg/hour of crushed waste of a rigid polyurethane foam based on the saccharose polyether mentioned in Example 1 and on diphenylmethane diisocyanate were reacted with 10.3 kg/hour of ethylene glycol under the reaction conditions described in Example 1. The recovered polyol which was discharged continuously from the outlet of the degradation installation was delivered to a mixing head and directly and continuously blended with 50 kg/hour of the pure saccharose polyether. The resulting polyol mixture had the following analytical values:
OH Number: 376.7
Acid Number: 0.7
Viscosity (50° C.): 22400 mPa.s The polyol mixture could be converted into a usable rigid foam in the following formulation:
100.0 parts, by weight, of polyol mixture,
1.2 parts, by weight, of dimethyl benzylamine,
1.0 parts, by weight, of sulphonated castor oil (50% aqueous solution),
0.5 parts, by weight, of silicone stabilizer OS-710,
3.0 parts, by weight, of water, and
184.0 parts, by weight of diphenylmethane diisocyanate (26% of NCO) (see example 2 a)
Starting time: 20 seconds
Rise time: 2.5 minutes
Bulk density of the rigid foam: 43.8 kg/m³.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the continuous glycolytic cleavage of polyurethane plastics waste, by the addition of ambient temperature or pre-heated diols, the process being carried out at elevated temperature and under elevated pressure, characterized in that the plastics waste is introduced via a feed funnel into a multi-shaft screw machine together with diols in a weight ratio of from 10:1 to 1:1, the mixture of plastics waste and diols being maintained in the screw machine in a reaction zone with intensive material and heat exchange for from 2 to 30 minutes at a temperature of from 250° to 350° C., while maintaining a liquid diol phase in the degradation mixture by a pressure of up to 100 bars, the polyol-containing degradation mixture resulting from the glycolytic degradation issuing into a cooled pressure-relieving vessel and into a cooled receiver via a discharge outlet connected to the screw machine, while maintaining the liquefying pressure and a constant liquid level, and the temperature of the resulting degradation polyol mixture being reduced to below 200° C. in less than 30 minutes.

2. A process according to claim 1, characterized in that alkali metal glycolates are introduced with the diols into the plastic waste.

3. A process according to claims 1 or 2, characterized in that the air which is introduced into the screw machine with the plastics waste is removed through a housing outlet positioned prior to said feed funnel in the direction of flow of the plastics waste.

4. A process according to claim 3, characterized in that a vacuum is applied to said housing outlet.

5. A process according to claims 1 or 2, characterized in that the weight ratio of plastics waste to diol is from 5:1 to 2:1.

6. A process according to claims 1 or 2, characterized in that the temperature in the reaction zone is from 260° to 300° C.

7. A process according to claims 1 or 2, characterized in that the mixture of plastics waste and diols or plastics waste, diols and alkali metal glycolates is maintained in the reaction zone for from 5 to 15 minutes.

* * * * *